(12) United States Patent
Seo

(10) Patent No.: US 7,994,754 B2
(45) Date of Patent: Aug. 9, 2011

(54) BATTERY CHARGING APPARATUS, BATTERY PACK, BATTERY CHARGING SYSTEM, AND BATTERY CHARGING METHOD

(75) Inventor: Kwang-youn Seo, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 960 days.

(21) Appl. No.: 11/876,068

(22) Filed: Oct. 22, 2007

(65) Prior Publication Data

US 2008/0252261 A1  Oct. 16, 2008

(30) Foreign Application Priority Data

Apr. 13, 2007 (KR) ........................ 10-2007-0036623

(51) Int. Cl.
*H02J 7/00* (2006.01)
*H02J 7/04* (2006.01)

(52) U.S. Cl. ........ 320/119; 320/116; 320/139; 320/142; 320/160

(58) Field of Classification Search .................... 320/119
See application file for complete search history.

(56) References Cited

U.S. PATENT DOCUMENTS 6,281,661 B2 * 8/2001 Kaite et al. ..................... 320/116
7,554,292 B2 * 6/2009 Veselic ......................... 320/116

* cited by examiner

*Primary Examiner* — Edward Tso
*Assistant Examiner* — Johali A Torres Ruiz
(74) *Attorney, Agent, or Firm* — Staas & Halsey LLP

(57) ABSTRACT

A battery pack charging method and battery charging apparatus including: a plurality of charge units which charge respective battery cells of the battery pack, by outputting pulse currents, generated from a supplied DC voltage, in response to enable signal; and a plurality of signal detection units to detect a falling edge of the pulse currents and to output the enable signals to the charge units.

18 Claims, 6 Drawing Sheets

BATTERY CHARGING APPARATUS, BATTERY PACK, BATTERY CHARGING SYSTEM, AND BATTERY CHARGING METHOD

CROSS-REFERENCE TO RELATED APPLICATION

This application claims the benefit of Korean Application No. 2007-36623, filed Apr. 13, 2007, in the Korean Intellectual Property Office, the disclosure of which is incorporated herein by reference.

BACKGROUND OF THE INVENTION

1. Field of the Invention

Aspects of the present invention relates to a battery charging apparatus, and more particularly, to a battery charging apparatus, a battery pack, a battery charging system, and a battery charging method.

2. Description of the Related Art

Rechargeable (secondary) batteries have been actively studied for use in mobile electronic devices, for example, mobile phones, notebook computers, camcorders, and Personal Digital Assistants (PDAs).

The most commonly used rechargeable batteries are Lithium Ion batteries, Lithium Ion Polymer batteries, Nickel-Cadmium batteries, Nickel Metal Hydride batteries, and the like. Among these, Lithium Ion batteries and Lithium Ion Polymer batteries, which are used for notebook computers, have many advantages, such as, a high energy density, a high operating voltage, good conservation characteristics, and a long service life. However, due to safety problems, it is difficult to manufacture Lithium Ion and Lithium Ion Polymer batteries having a high enough power, to enable a high current flow.

FIG. 1 is a block diagram illustrating a conventional battery charging apparatus and a battery pack. Referring to FIG. 1, an AC/DC converter 102 converts an AC voltage supplied from a voltage receptacle into a DC voltage and transmits the converted DC voltage to a charger 104.

The charger 104 controls the charging of a battery pack 106. When the charger 104 is used for charging a Lithium Ion Polymer battery pack, the charger 104 employs a constant current/constant voltage method or a pulse charging method. These methods are relatively safer charging methods, as compared to a method for charging a Nickel-Cadmium battery or a Nickel Metal Hydride battery. In the case of the Lithium Ion Polymer battery pack, a basic voltage and a charging voltage, per a battery cell, are 3.7 volts and 4.2 volts, respectively, and a charging current is generally less than 1 Coulomb (C).

The battery pack 106 includes a Protection Control Module (PCM) 108 and a plurality of battery cells 110, 112, and 114. The battery pack 106 includes the PCM 108 to prevent an overcharge or an overdischarge of a Lithium Ion battery or a Lithium Ion Polymer battery, due to safety problems. Current from the PCM 108 is equally applied to all of the battery cells 110, 112, and 114, when charging the battery pack 106.

FIG. 2 shows a graph of a battery charging process performed by the battery charging apparatus of FIG. 1, using a conventional constant current/constant voltage method. Referring to FIG. 2, the charger 104 regularly applies a maximum charging current $I_{MAX}$ to the battery pack 106. Then, a voltage 204 of the battery pack 106 is increased gradually up to a charging voltage $V_{REG}$ (defined as a "constant current" state). When the voltage 204 of the battery pack 106 reaches the charging voltage $V_{REG}$, the voltage 204 is maintained and then a current 202 is gradually decreased (defined as a "constant voltage" state). When the current 202 decreases to a minimum current $I_{MIN}$, the charging is ended.

In order to reduce the time required for fully charging a battery, the maximum charging current $I_{MAX}$ should be increased. However, increasing the maximum charging current $I_{MAX}$ can reduce the performance of a battery.

FIG. 3 shows a graph of a battery charging process performed by a battery charging apparatus, using a conventional pulse charging method. Referring to FIG. 3, to solve the aforementioned problem, a pulse current 302, which includes a plurality of charge pulses, is used in the pulse charging. The pulse current 302 can protect battery performance and reduce the time required for charging. In the conventional pulse charging method, a battery voltage 304 is detected, charging is stopped when the battery voltage 304 reaches a voltage $V_1$, and charging is resumed when the battery voltage 304 declines to a voltage $V_2$.

However, in a Lithium Ion Polymer battery pack having 3 battery cells connected in parallel and each having a capacity of 1000 mAh, the charging time increases due to a limitation on the charging current needed by the battery cell. Also, when a plurality of battery cells are connected in parallel, a battery charging capacity should be determined considering a capacity of a charger. In this case, a charging time of at least 5 hours is required, due to the charging current limitations of each battery cell. Therefore, the battery charging time, which increases in proportion to an increase of battery capacity, should be reduced.

SUMMARY OF THE INVENTION

Aspects of the present invention provide a battery charging apparatus, a battery pack, a battery charging system, and a battery charging method to reduce a battery charging time. The charging time generally increases as the capacity of a battery increases.

According to aspects of the present invention, there is provided a battery charging apparatus to charge a battery pack having a plurality of battery cells. The battery charging apparatus includes: a plurality of charge units, to charge each of the battery cells by outputting pulse currents; and a plurality of signal detection units, which respectively detect a falling edge of the pulse current output from each of the plurality of charge units. The signal detection units input an enable signal to a next charge unit, which is different from the charge unit where the falling edge has been detected. The charge units can generate the pulse currents from a supplied DC voltage. The charge units can output the pulse currents in response to the enable signal.

One of the charge units outputs the pulse current without receiving the enable signal, in an initial operation. The pulse currents output from the charge units generally do not temporally overlap each other. The signal detection unit can input the enable signal after a predetermined time period elapses, following the detection of the falling edge.

The battery charging apparatus further includes an AC/DC converter, which converts a supplied AC voltage into a DC voltage. The DC voltage is supplied to the plurality of charge units. The charge units sequentially output the pulse currents, such that only one charge unit outputs the pulse current at a time, i.e., the pulse currents do not overlap.

According to other aspects of the present invention, provided is a battery pack including: a plurality of battery cells; and a plurality of Protection Control Modules (PCMs) respectively connected to the battery cells. The battery cells are charged by receiving pulse currents from a plurality of current sources, via the PCMs. The pulse currents do not temporally overlap each other. The charging operation is repeated until charging of the battery cells is completed. The battery pack is a Lithium Ion Polymer battery pack.

According to other aspects of the present invention, there is provided a battery charging system, which charges a battery pack having a plurality of battery cells. The battery charging system includes a plurality of charge units, which respectively charge the battery cells by outputting pulse currents. The pulse currents can be generated from a supplied DC voltage. The pulse currents can be output to the battery cells in response to an enable signal. The battery charging system can include a plurality of signal detection units, which respectively detect a falling edge of the pulse currents applied to each of the plurality of the charge units. The signal detection units sequentially output the enable signal to the charge units. The sequence of the output of the enable signals is determined according to which battery cell the falling edge has been detected. The enable signal can be output to a battery cell adjacent to a battery cell where the falling edge has been detected. The battery charging system can include a plurality of PCMs, which are respectively connected to the charge units; and a plurality of battery cells, which are respectively connected to the PCMs. The battery cells are charged by respectively receiving pulse currents, via the PCMs. The pulse currents are output from the charge units one at a time, such that they do not overlap.

According to aspects of the present invention, there is provided a battery charging method to charge a battery pack having a plurality of battery cells. The method includes: charging the battery cells by outputting a pulse current, generated from a supplied DC voltage, from a plurality of charge units to each of the battery cells; detecting a falling edge of one of the pulse currents; inputting an enable signal to a next charge unit where the falling edge has been detected; and outputting the pulse current to the charge unit to which the enable signal has been input.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings, of which.

DETAILED DESCRIPTION OF THE EMBODIMENTS

Figure 1:
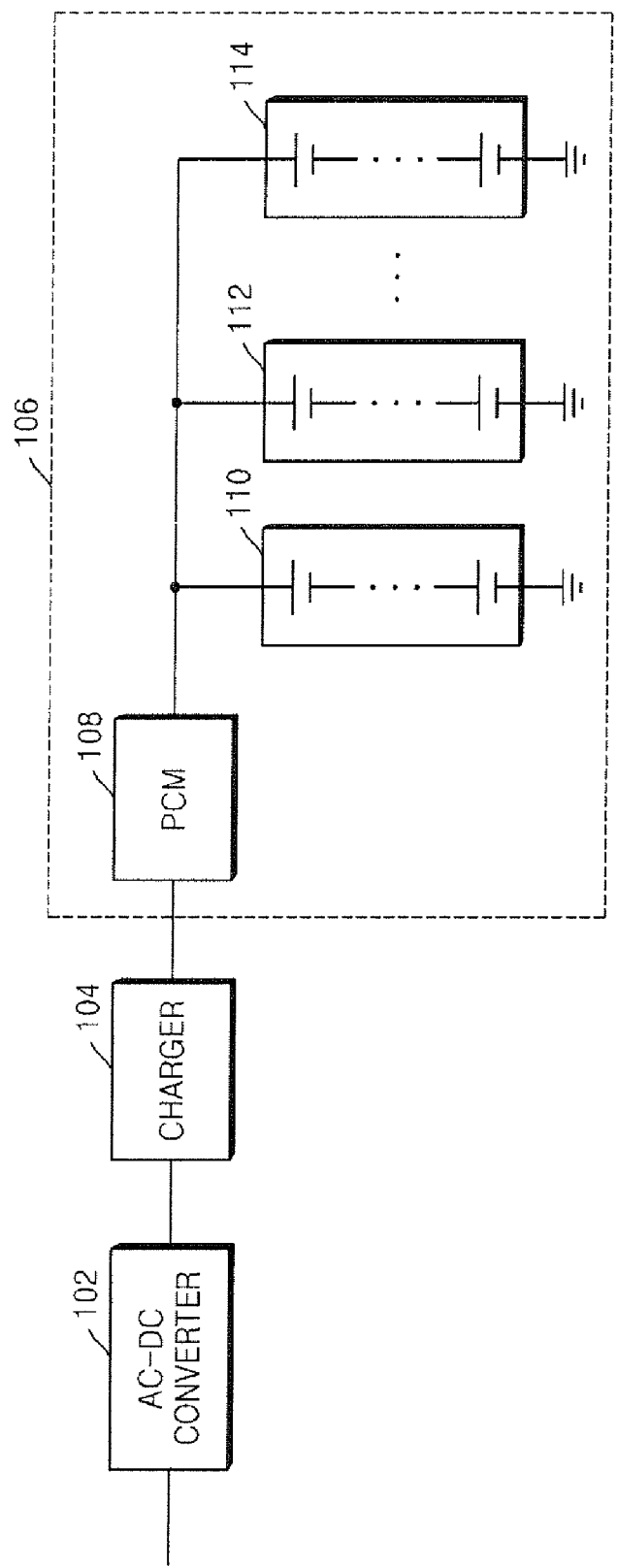
FIG. 1 a block diagram illustrating a conventional battery charging apparatus and a conventional batter pack.
Figure 2:
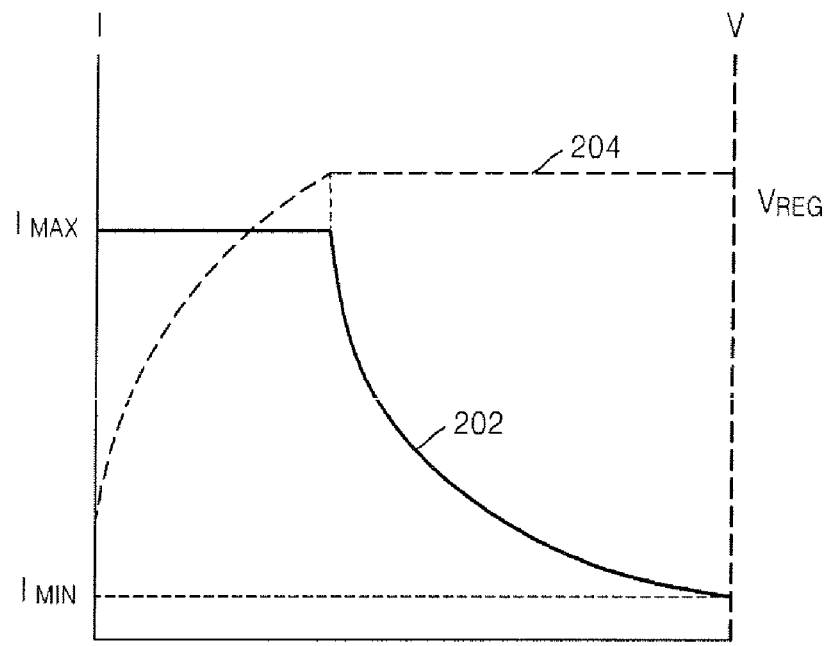
FIG. 2 is a graph of a battery charging process performed by a battery charging apparatus using a conventional constant current/constant voltage method.
Figure 3:
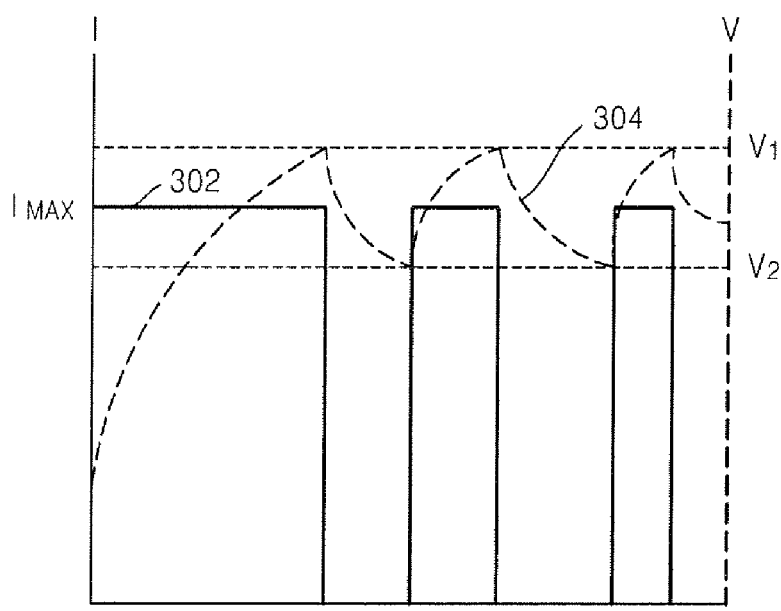
FIG. 3 is a graph of a battery charging process by a battery charging apparatus using a conventional pulse charging method.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 4:
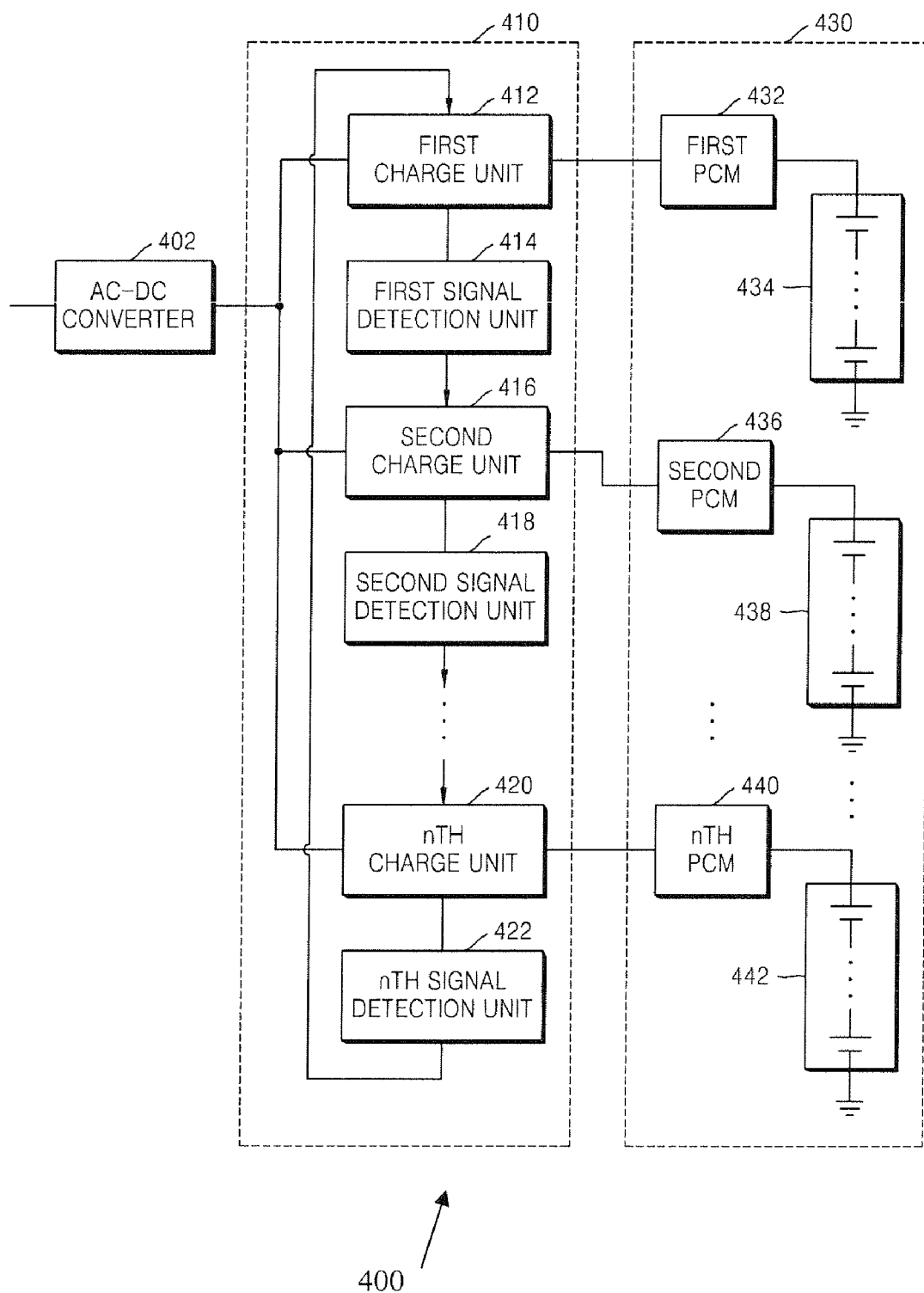
FIG. 4 is a block diagram illustrating a battery charging apparatus and a battery pack, according to an exemplary embodiment of the present invention.

FIG. 4 is a diagram illustrating a battery charging apparatus and a battery pack, according to an exemplary embodiment of the present invention. Referring to FIG. 4, the battery charging apparatus 410 includes a plurality of charge units 412, 416, and 420, and a plurality of signal detection units 414, 418, and 422.

The charge units 412, 416, and 420 receive a DC voltage from an AC/DC converter 402. The charge units 412, 416, and 420 (first, second, and $n^{th}$) generate and output pulse currents to charge a plurality of battery cells 434, 438, and 442 (first, second, and $n^{th}$). The first charge unit 412 controls the charging of the first battery cell 434, such that the first battery cell 434 is charged via a first Protection Control Module (PCM). The second charge unit 416 controls the charging of the second battery cell 438, such that the second battery cell 438 is charged via a second PCM. The $n^{th}$ charge unit 420 controls charging of the $n^{th}$ battery cell 442, such that the $n^{th}$ battery cell 442 is charged via an $n^{th}$ PCM. As referred to herein, n is an integer.

The pulse currents reduce a charging time and prevent a reduction of battery performance. The charge units 412, 416, and 420 detect a voltage of the battery cells 434, 438, and 442, stop the charging when the battery voltage is increased to a first voltage $V_1$, and resume charging when the battery voltage decreases to a second voltage $V_2$, which is lower than the first voltage $V_1$.

The pulse current is output from the charge units 412, 416, and 420 to PCMs 432, 436, and 440, which are disposed within a battery pack 430. The charge units 412, 416, and 420 are electrically connected to the signal detection units 414, 418, and 422. The signal detection units 414, 418, and 422 can detect a variation of the pulse current in the charge units 412, 416, and 420.

The charge units 412, 416, and 420 operate in conjunction with each other. Only the charge unit to which an enable signal is input, outputs the pulse current. The charge units to which the enable signal is not input maintain an "OFF" state. However, in order to start an initial operation of the charge units 412, 416, and 420 when the DC voltage is supplied, a charge unit, for example, the first charge unit, which initially outputs the pulse current, is set to output the pulse current without an input enable signal. Except this initial operation, the charge unit, which initially outputs the pulse current, outputs the pulse current only when the enable signal is input thereto.

The signal detection units 414, 418, and 422 are electrically connected with the charge units 412, 416, and 420, respectively. To charge another battery cell using a pause period, during which a certain charge unit enters an "OFF" state and the pulse current drops to a 0 voltage, the signal detection units 414, 418, and 422 detect a falling edge of one of the pulse currents which flow in the charge units 412, 416, and 420 and then waits for the pause period to elapse before outputting the enable signal to a next one of the charge units 412, 416, and 420.

When one of the signal detection units 414, 418, and 422 detects a falling edge of the pulse current, which flows in one of the charge units 412, 416, and 420, the signal detection unit outputs the enable signal to the next charge unit that is electrically connected thereto. The next charge unit, to which the enable signal is input, outputs the pulse current to the battery cell via the PCM. After the pulse current is output, the charge unit does not output another pulse current after the pause period, but instead maintains the "OFF" state until another enable signal is input from the signal detection unit.

During the falling edge of the pulse current, a time period (pause period) elapses until a charge unit enters an "OFF" state. Accordingly, one of the signal detection units 414, 418, and 422 may output the enable signal to the next charge unit, after a predetermined time (pause period), rather than output the enable signal to the next charge unit as soon as one of the signal detection units 414, 418, and 422 detects the falling edge of a pulse current from a respective one of the charge units 412, 416, and 420. By repeating the above-described operations, the charge units 412, 416, and 420 repeatedly output pulse currents, orderly and sequentially, without temporally overlapping the pulse currents The corresponding battery cell may be charged up to 1 Coulomb (C), and a battery with a high capacity, or including a plurality of battery cells, may be completely charged in a short time period, for example, within 2 hours. Also, since the charging of a charge unit is performed during the pause period another charge unit, the battery charging apparatus 410 is efficiently used.

The battery charging apparatus 410 may further include the AC/DC converter 402, which converts an AC voltage supplied from a voltage receptacle (not shown) into a DC voltage. The DC voltage can be supplied to the charge units 412, 416, and 420.

Referring to FIG. 4, the battery pack 430, according to an exemplary embodiment of the present invention, includes the plurality of PCMs 432, 436, and 440 and the battery cells 434, 438, and 442. The PCMs 432, 436, and 440 are connected electrically with the respective battery cells 434, 438, and 442 and can prevent each of the battery cells 434, 438, and 442 from being overcharged, overdischarged, overheated, or having an overcurrent flow. Also, the PCMs 432, 436, and 440 receive the pulse currents from a plurality of current sources, which are outside of the battery pack 430. The PCMs 432, 436, and 440 charge the respective battery cells 434, 438, and 442.

The battery cells 434, 438, and 442 are charged by receiving the pulse currents, which are input via the separate PCMs 432, 436, and 440. The pulse currents are input to each of the battery cells 434, 438, and 442, such that they do not temporally overlap. Therefore, only when a charging period of one battery cell is ended, that is, the falling edge of the pulse current is detected in the certain battery cell, is another battery cell charged. These operations are sequentially repeated until the charging of all of the battery cells is completed.

The battery pack 430 may be a Lithium Ion Polymer battery pack. A battery charging system 400, according to an embodiment of the present invention, may include the battery charging apparatus 410 and the battery pack 430, which have been already described.

Figure 5:
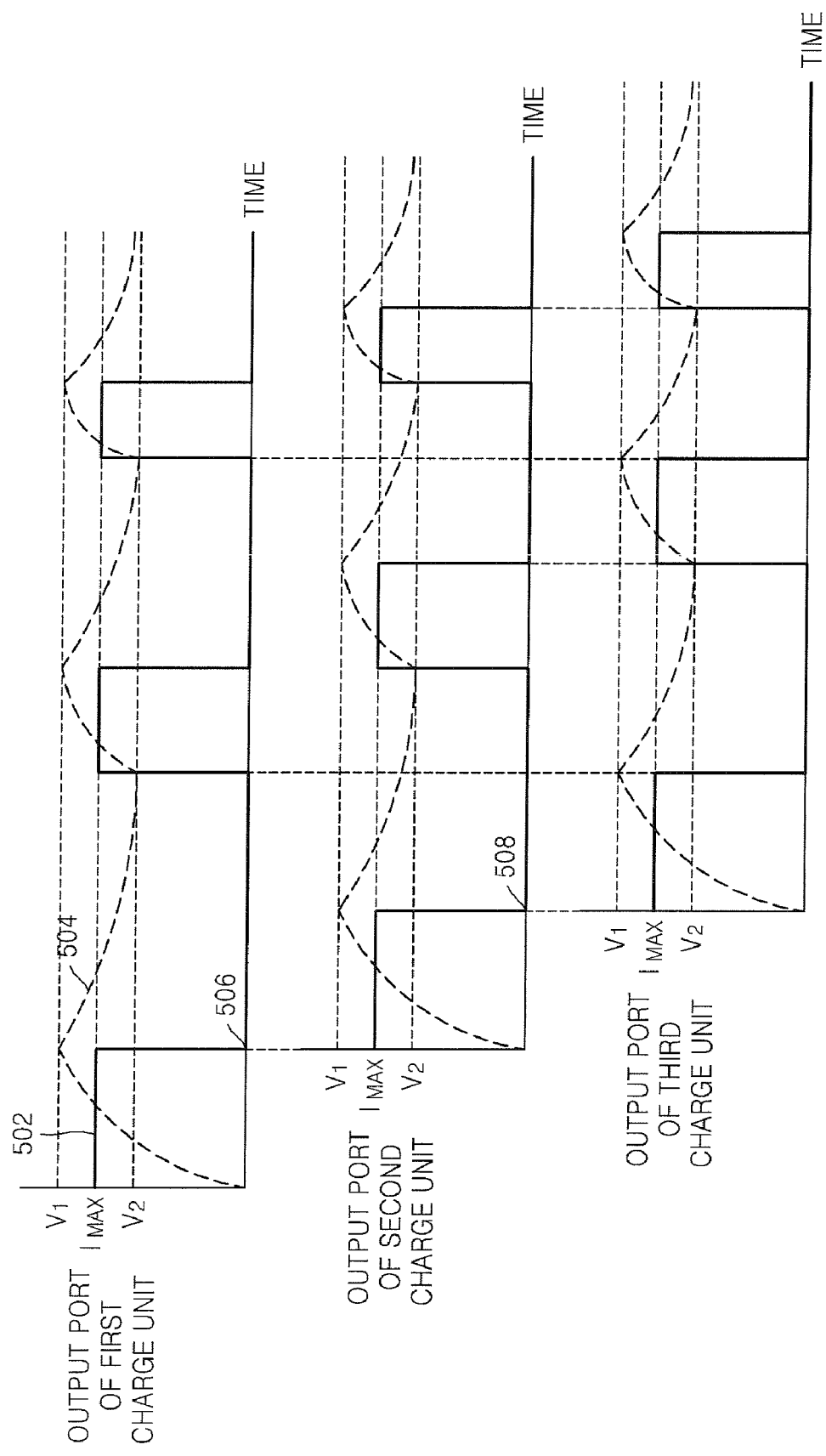
FIG. 5 is a diagram illustrating a battery charging process performed by the battery charging apparatus of FIG. 4, according to an exemplary embodiment of the present invention.

FIG. 5 is a diagram illustrating a battery charging process performed by the battery charging system 400 of FIG. 4, according to an exemplary embodiment of the present invention. Referring to FIG. 5, a current (solid line) from the charge units 412, 416, and 420 to the battery cells 434, 438, and 442, and a voltage (dotted line) supplied to the battery cells 434, 438, and 442 and the PCMs 432, 436, and 440, are shown. The voltage and the current of a first charging end, a second charging end, and a third charging end are respectively shown in the upper, middle, and lower graphs of FIG. 5. FIG. 5 is an example to show the variation of the voltage and the current, according to an exemplary embodiment of the present invention, wherein each battery cell is associated with a respective charge unit, PCM, and detection unit.

When the battery charging apparatus 410 first receives the DC voltage, the first charge unit 412 starts an initial operation. In the initial operation, the first charge unit 412 is triggered without receiving the enable signal and outputs the pulse current to the first battery cell 434. The voltage of the first battery cell 434 is increased by the pulse current. When the voltage of the first battery cell 434 reaches the voltage $V_1$, the first charge unit 412 stops outputting the pulse current and enters an "OFF" state 506. Since the output of the pulse current from the first charge unit 412 is stopped, the voltage in the first battery cell 434 decreases.

The first signal detection unit 414 detects a time when the first charge unit 412 stops outputting the pulse current and enters the "OFF" state. For example, when the signal detection 414 unit detects the falling edge of the pulse current (a drop in the pulse current). When the falling edge of the pulse current is detected, the first signal detection unit 414 outputs the enable signal the second charge unit 416. The first signal detection unit may output the enable signal after a time period (pause period) elapses, since it can take a certain amount of time for the pulse current to decrease from $I_{MAX}$ to 0. If the enable signal is input as soon as the falling edge of the pulse current is detected, the first charge unit 412 and the second charge unit 416 may concurrently output the pulse currents.

When the enable signal is input to the second charge unit 416, the second charge unit 416 outputs the pulse current to the second battery cell 438. The voltage of the second battery cell 438 is increased by the pulse current. When the voltage of the second battery cell 438 reaches the voltage $V_1$, the second charge unit 416 stops outputting the pulse current and enters an "OFF" state 508. When the pulse current output from the second charge unit 416 is stopped, the voltage in the second battery cell 438 begins to decrease. By repeating these operations for each of the battery cells 434, 438, and 442, the battery pack can be charged efficiently. The operations can be repeated multiple times for each of the battery cells 434, 438, and 442. The operations can be performed with or without the pause period, according to a pulse charging method. The operations can be performed on any number of battery cells in a battery pack.

Figure 6:
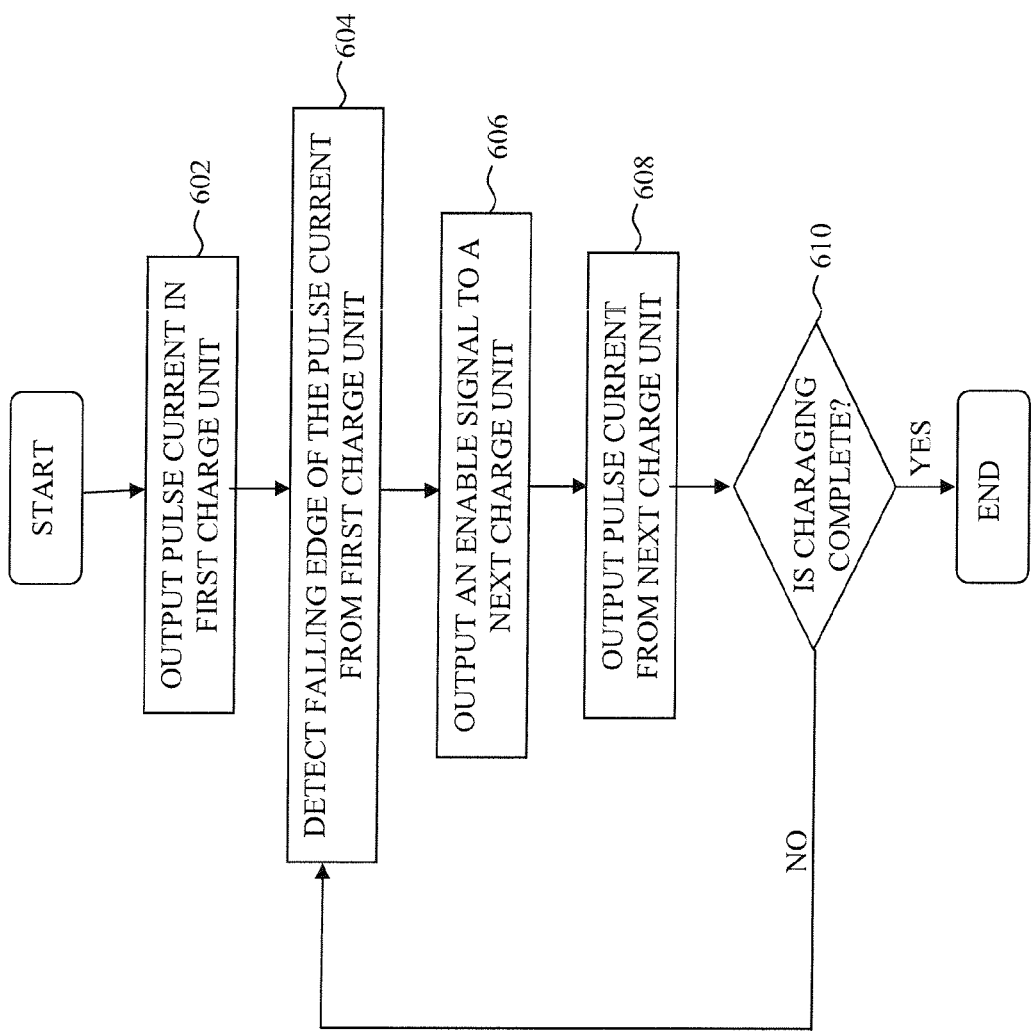
FIG. 6 is a flowchart of a battery charging method, according to an exemplary embodiment of the present invention.

FIG. 6 is a flowchart of a battery charging method, according to an exemplary embodiment of the present invention. Referring to FIG. 6, a plurality of charge units receive a DC voltage and output the pulse currents to the cells of a battery pack and receive a DC voltage. A first charge unit generates and outputs a pulse current in operation 602. As described above, when the charging begins, the first charge unit initially generates and outputs the pulse current without receiving an enable signal.

A first signal detection unit detects a falling edge of the pulse current from the first charge unit, in operation 604. In operation 606, the first signal detection unit inputs the enable signal to a next charge unit, following the detection of the falling edge of the pulse current. In operation 608, the next charge unit, in which the enable signal is input, generates and outputs the pulse current, thereby charging the connected battery cell.

In operation 610, a determination is made as to whether charging is complete. If charging is complete, i.e., if all the battery cells are charged, the method ends. If charging is not complete, the method returns to operation 604, and the method continues in this manner until all the battery cells are completely charged. For example, each battery cell may have output currents output thereto multiple times, and the output currents may be sequentially applied to each of the battery cells.

Figure 7:
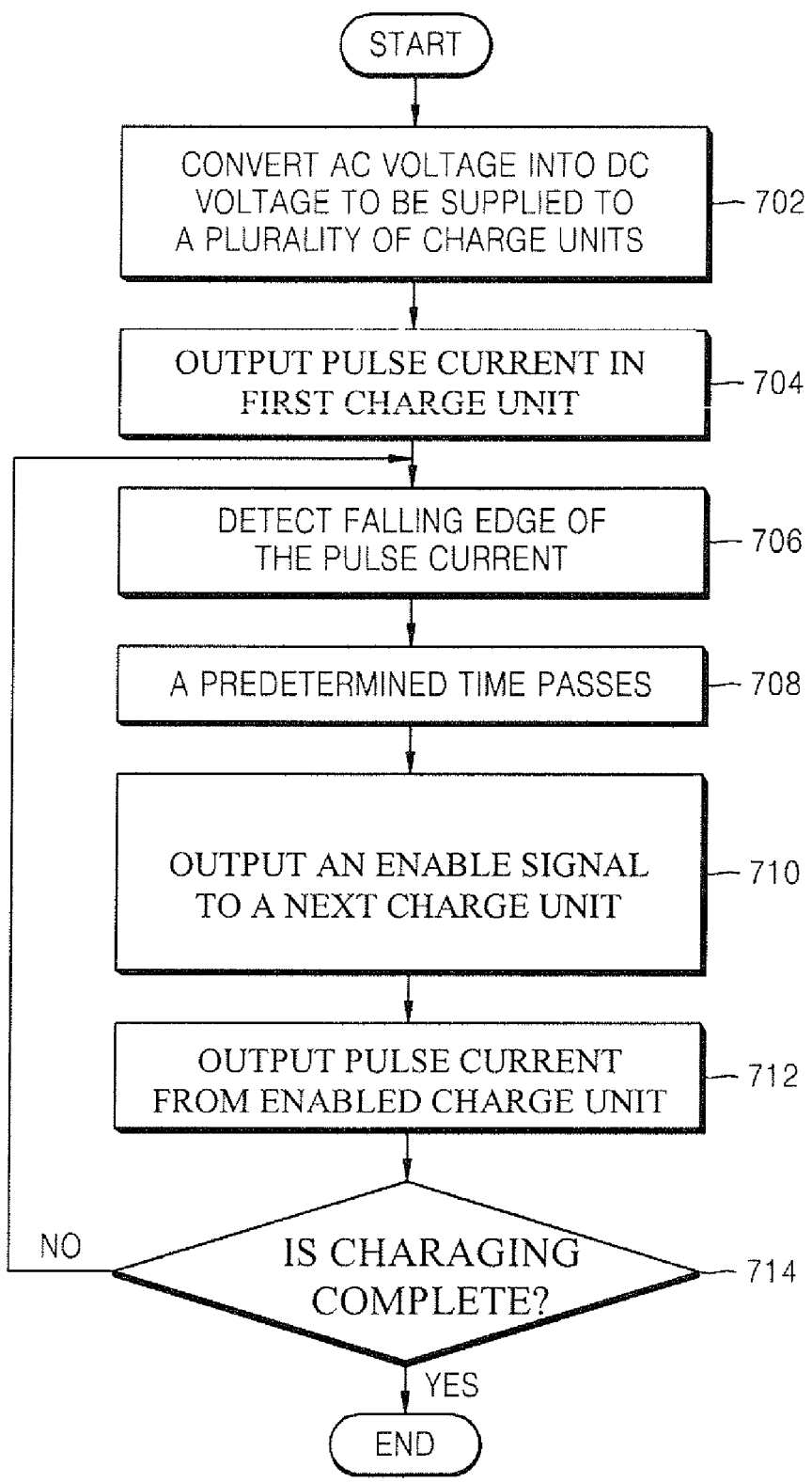
FIG. 7 is a flowchart of a battery charging method, according to an exemplary embodiment of the present invention.

FIG. 7 is a flowchart of a battery charging method according to another exemplary embodiment of the present invention. Referring to FIG. 7, an AC/DC converter receives an AC voltage from a voltage outlet receptacle, or the like, and converts the AC voltage into a DC voltage. The DC voltage is supplied to a plurality of charge units, in operation 702.

In operation 704, a first charge unit, to which the DC voltage is supplied, generates and outputs the pulse current without receiving an enable signal. A signal detection unit detects a falling edge of the pulse current, in operation 706. A time period (pause period) elapses in operation 708. The time period can be predetermined or can be set by a user. In operation 710, the signal detection unit outputs the enable signal to the charge unit next to a next charge unit after the falling edge of the pulse current from a previous charge unit has been detected. The next charge unit can be a charge unit connected to a battery cell adjacent to battery cell that just received the pulse current or can be the charge unit of any other cell in the battery pack, so long as each of the battery cells is charged.

In operation 712, the charge unit, which received the enable signal, charges the associated battery cell by generating and outputting the pulse current. In operation 714, the operations 706 through 712 are repeated until all of the battery cells are charged. For example, each battery cell may have output currents output thereto multiple times, and the output currents may be sequentially applied to each of the battery cells.

As described above, according to the exemplary embodiments of the present invention, in the battery charging apparatus, the battery pack, the battery charging system, and the battery charging method, the pulse currents, which are output from the plurality of charge units, are directed into the plurality of battery cells, via the plurality of PCMs. The pulse current is output from each of the charge units after the pause period, so that the battery charging time can be reduced.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A battery charging apparatus to charge a battery pack comprising battery cells, the battery charging apparatus comprising:

charge units, to generate pulse currents from a DC voltage, and to output the pulse currents to the battery cells, in response to received enable signals, to charge the batteries; and signal detection units to detect falling edges of the pulse currents and to output the enable signals to the charge units, wherein each detection unit detects the falling edge of the pulse current generated by one of the charge units and then outputs the enable signal to a different one of the charge units.

2. The battery charging apparatus of claim 1, wherein during an initial operation, one of the charge units outputs one of the pulse currents without receiving one of the enable signals.

3. The battery charging apparatus of claim 1, wherein at any given time only one of the pulse currents is output from the charge units.

4. The battery charging apparatus of claim 1, wherein the signal detection units detect the falling edges of the pulse currents, enter a pause period, and then output the enable signals.

5. The battery charging apparatus of claim 1, further comprising an AC/DC converter to convert a supplied AC voltage into the DC voltage.

6. The battery charging apparatus of claim 1, wherein the charge units output the pulse currents sequentially such that the pulse currents do not overlap.

7. A battery charging system comprising:

a battery pack comprising battery cells;

charge units to generate pulse currents from a DC voltage, and to output the pulse currents to the battery cells, in response to received enable signals;

detection units to detect falling edges of the pulse currents, and to input the enable signals to the charge units in response to the detection of the falling edges; and Protection Control Modules (PCMs) connected between each of the charge units and the battery cells, wherein the pulse currents are output from the charge units to the battery cells one at a time without overlapping, via the PCMs.

8. The battery charging system of claim 7, wherein the charge units output the pulse currents to each of the battery cells multiple times until charging of the battery cells is completed.

9. The battery charging system of claim 7, wherein in an initial operation one of the charge units outputs one of the pulse currents without receiving an enable signal input.

10. The battery charging system of claim 7, wherein the signal detection units detect the falling edges of the pulse currents, enter pause periods, and then output the enable signals after the pause periods have elapsed.

11. The battery charging system of claim 7, further comprising an AC/DC converter to convert a supplied AC voltage into the DC voltage.

12. The battery charging system of claim 7, wherein the battery pack is a Lithium Ion Polymer battery pack.

13. A method for charging battery cells of a battery pack, the method comprising:

initiating the charging by outputting a pulse current from a first charge unit to one of the battery cells;

detecting a falling edge of the pulse current;

outputting an enable signal to a different charge unit connected to a different one of the battery cells after the falling edge is detected; and outputting a pulse current from the different charge unit to the different battery cell.

14. The battery charging method of claim 13, further comprising repeating the detecting of the falling edge, outputting of the enable signal, and outputting of the pulse current for each of the battery cells, until all of the battery cells are completely charged.

15. The battery charging method of claim 13, wherein in the initiating of the charging comprises outputting a pulse current from the first charge unit without an enable signal being output thereto.

16. The battery charging method of claim 13, wherein the pulse currents are output at different times without overlapping.

17. The battery charging method of claim 13, wherein in the outputting of the enable signal comprises entering a pause period after the falling edge is detected and then outputting the enable signal after the pause period has elapsed.

18. The battery charging method of claim 13, further comprising converting an AC voltage into a DC voltage and supplying the DC voltage to the charge units.

* * * * *